Figure 1:
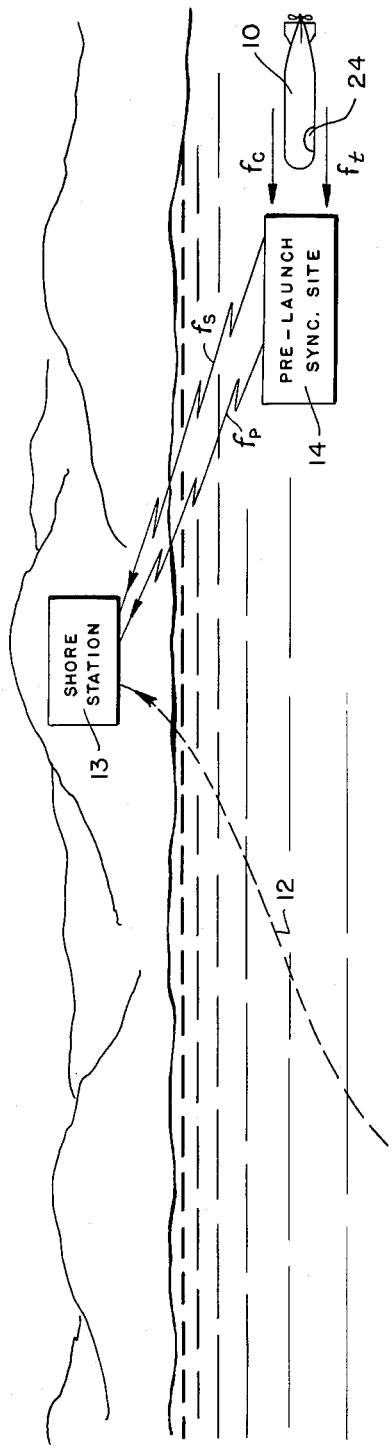
Figure 1:
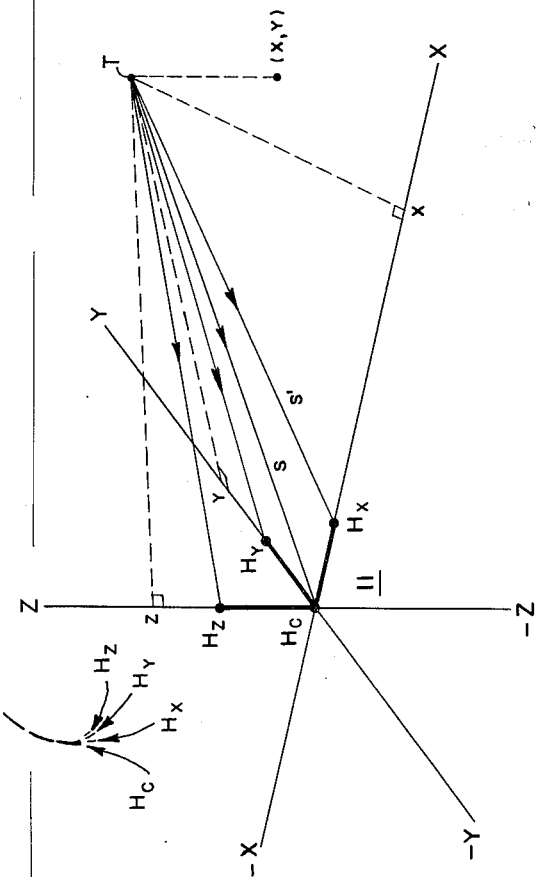

Sept. 7, 1965

R. N. FOSS 3,205,475

TORPEDO TRACKING SYSTEM

Filed Aug. 23, 1963

2 Sheets-Sheet 1

INVENTOR.
RENE N. FOSS
BY
ATTORNEY.

Sept. 7, 1965   R. N. FOSS   3,205,475
TORPEDO TRACKING SYSTEM
Filed Aug. 23, 1963   2 Sheets-Sheet 2
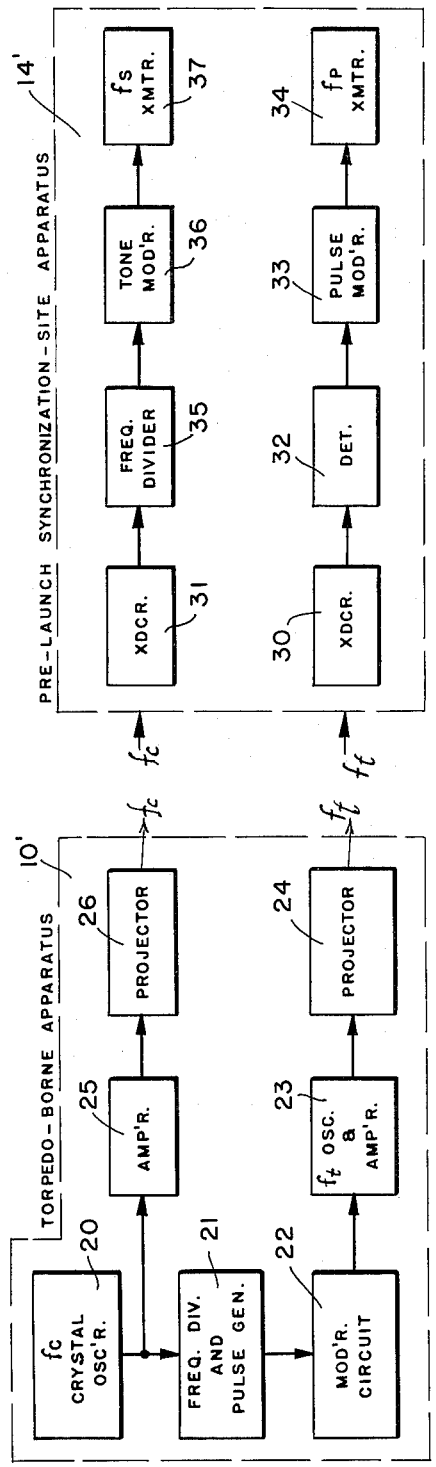
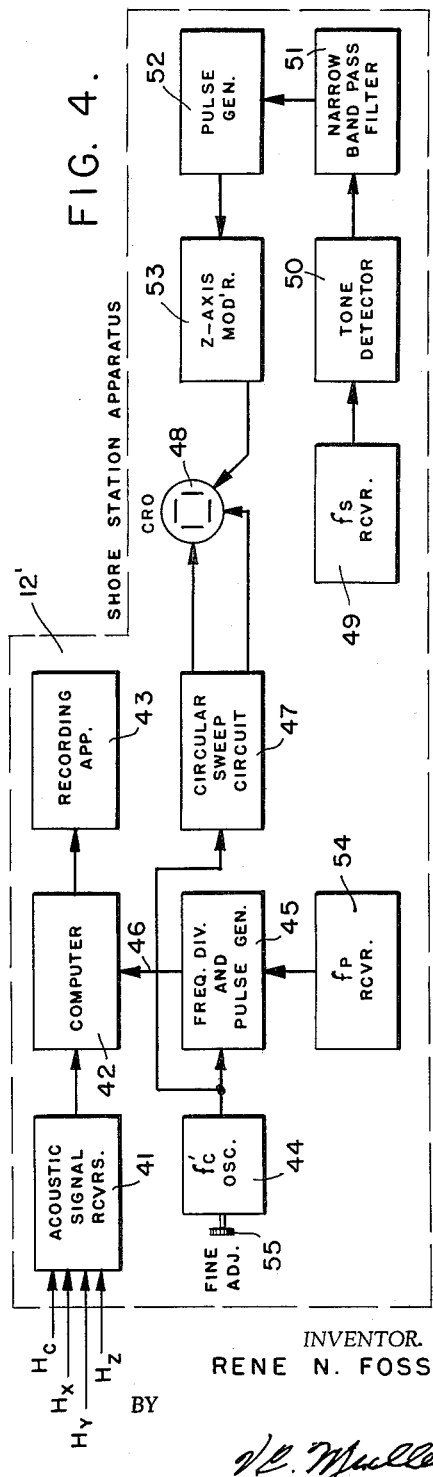
INVENTOR.
RENE N. FOSS
BY
ATTORNEY.

United States Patent Office 3,205,475
Patented Sept. 7, 1965

3,205,475
TORPEDO TRACKING SYSTEM
Rene N. Foss, Seattle, Wash., assignor, by mesne assignments, to the United States of America as represented by the Secretary of the Navy
Filed Aug. 23, 1963, Ser. No. 304,291
5 Claims. (Cl. 340—6)

This invention relates generally to remote object detection and location, and more particularly to an improved method and apparatus for detecting the presence, and ascertaining and recording the locations and movements, of both surface and submerged watercraft and other bodies of interest under investigation.

The invention is directly intended and particularly suitable for use in determining the performance of homing types of torpedoes operating against simulated targets in a proofing or test water region, and the invention will therefore be described principally in terms of such application.

In an earlier (and in certain respects similar) system, the location of a body under investigation is determined in terms of its three rectangular coordinates in a fixedly-positioned Cartesian coordinate reference frame. This is accomplished by use of an echo-ranging system employing a shore-station-based transmitter, associated with an underwater electro-acoustic projector (transmitting transducer), for transmission of ultrasonic interrogation pulses, and a shore-station-based receiver, associated with four hydrophones (receiving transducers) lying along lines defining the three mutually perpendicular X, Y and Z axes of the coordinate frame, for reception of reply pulses from the body. The location of the so-called center hydrophone establishes the coordinate frame origin; the other three hydrophones of the array are spaced from the center hydrophone along the coordinate axes at base distances (say of the order of ten feet) which are comparatively short relative to the variable ranges of the body. The projector for practical reasons is located within the hydrophone array at a point displaced by several feet from the center hydrophone. In order to facilitate positioning of the projector and hydrophones, they are mounted upon a rigid framework which is then anchored or otherwise suitably stationed upon or close to the water bed in a manner to maintain the Cartesian coordinate reference frame in fixed location, at known depth, and in fixed orientation with the Z-axis vertical and the X and Y axes pointed in desired directions. The remote shore-station-based transmitter, receiver and associated computer and recorder apparatus are connected by cabling to the projector and hydrophone array. The computer apparatus in effect measures, and converts to corresponding voltages, certain time intervals (defined by pulse transmission and reception instants) which, in that particular system, corresponds with varying degrees of accuracy to slant ranges and slant range differences in the geometrical figures including the hydrophone array and the body under investigation; the computer apparatus further operates upon or utilizes these voltages to derive therefrom resultant voltages which correspond to the positional coordinates of the body but to a degree of accuracy limited by various factors, the factors of concern in this instance being slant range measurement inaccuracies inherent to the described echo-ranging system and to the particular coordinate formula and computation technique employed with that system. Computation of each coordinate is effected in accordance with the expression $$\frac{(r)(\Delta S)}{d} \quad (1)$$

wherein the so-called range $r$ approximates the true slant range of the body relative to the Cartesian coordinate reference frame origin, wherein $d$ is the spacing of the pair of hydrophones defining the coordinate axis, and wherein $\Delta S$, the difference in slant ranges as measured from each of the pair of hydrophones, approximates the projection of $d$ upon the greater slant range line.

While measurement of range $r$ in the foregoing system is based upon two-way transmission, the $S/N$ (signal-to-noise) ratio at the receiver hydrophones, and correspondingly the maximum range capability of the system, is improved to that corresponding to one-way transmission, by providing transponders in the torpedoes. Such a system thus operates admirably with most types of torpedoes, but it has nevertheless been found impossible to trigger the transponders reliably and at desired maximum ranges in the case of certain types of torpedoes which generate sufficient noise to inhibit proper triggering action by the interrogation pulses, and this therefore presents another limitation, in addition to positional coordinate accuracy limitations, in use of the foregoing system.

It is an object of the present invention to provide an apparatus for determining the three-dimensional location of a body with greater precision than heretofore.

It is a further object of the invention to provide an improved detection and location system having greater reliability of operation as to reception of ultrasonic pulses from the body under investigation at maximum ranges.

Other objects and advantages of this invention will be readily appreciated as the same becomes better understood by reference to the following description when considered in connection with the accompanying drawing wherein:

FIG. 1 depicts generally and schematically the major elements of an illustrative system in accordance with the present invention, specifically a torpedo carrying signal-generating and transmitting apparatus, a remotely-located hydrophone array and associated shore-station-based apparatus, and a pre-launch synchronization-site having apparatus providing a communication link between the torpedo and the shore station apparatus for pre-launch synchronization operations; and FIGS. 2, 3 and 4 illustrate, in block diagram form, conventional units in exemplary arrangements in accordance with the invention for use in the torpedo, at the synchronization-site and at the shore station, respectively.

In accordance with the present invention, the system for determination of the location of a body involves one-way pulse transmission (from the body to the hydrophones), generation of computer reference-pulses at precisely the same instants as pulse transmissions from the body, measurement of the time intervals between reference-pulse instants and related reception instants of body-emitted pulses, corresponding to slant range measurements without approximations, and computer-solution of an exact coordinate formula involving only predetermined constants and the said time intervals.

Referring first to FIG. 1, torpedo 10 is to be understood as carrying both an electronic-clock-controlled ultrasonic pulse transmitter and an unmodulated ultrasonic CW (continuous wave) transmitter, as later detailed, in addition to its usual propulsion and control apparatus. The Cartesian coordinate reference frame is again defined by an under water array 11 of four hydrophones $H_c$, $H_x$, $H_y$ and $H_z$ as indicated, these being connected by cabling 12 to apparatus at shore station 13. The shore station apparatus and the underwater array 11 in this system do not include a transmitter and projector since only one-way transmission from the torpedo is involved, timing or reference pulses for use by the computer section of the shore station apparatus here being provided by an electronic-clock-controlled apparatus at the shore station, synchronized with the electronic-clock apparatus of the torpedo, prior to torpedo launch, through the medium of a radio link from the prelaunch synchronization-site 14 to shore station 13, as later detailed. It will be understood that when the torpedo is launched, following clock-synchronization operations, torpedo tracking is effected at shore station 13. It will also be understood that, in FIG. 1, torpedo 10 is shown in exaggerated size relative to the pre-launch synchronization-site 14, and that the hydrophone array 11 is shown at greatly foreshortened distances relative to the water surface, to shore station 13, and to the torpedo at any distant point T.

As in the earlier system described above, considered generally, the three-dimensional location of the body under investigation is determined in terms of its three rectangular coordinates in the fixedly-positioned Cartesian coordinate reference frame and by use of certain distance measurements as obtained from the ranging system, but here slant range measurements alone are made (without slant range difference measurements), with no approximations, and each coordinate is precisely defined by the mathematical expression $$\frac{(S)^2-(S^1)^2}{2d}+\frac{d}{2} \qquad (2)$$

wherein constant $d$ is the fixed spacing between hydrophones on the corresponding coordinate axis, variable $S$ is the slant range of the distant body relative to the center hydrophone, and variable $S'$ is the slant range as measured from hydrophone $H_x$, $H_y$ or $H_z$ dependent upon the particular coordinate of interest. In FIG. 1, by way of example these distances are identified for the X-coordinate geometric figure lying in the oblique plane containing the X-axis and any point T at which the torpedo is located. The coordinates are of course determined in the form of proportional voltages, derived by computer action involving the intervals between a reference pulse occurrence (corresponding to an ultrasonic pulse transmission instant) and ensuing reception of an ultrasonic pulse at each of the hydrophones.

Referring now to FIG. 2, the torpedo-borne apparatus 10' operates to provide an unmodulated signal at a frequency $f_c$, in this instance nominally at 77.46 kc./s., in additional to pulses at an ultrasonic carrier frequency $f_t$ of say 250 kc./s. and at precisely repetitive periods (set by a sub-multiple of frequency $f_c$) for use in torpedo location determination. The signal at frequency $f_c$ is generated by a clock-oscillator 20, so-termed because it is further utilized with a frequency divider and pulse generator circuit 21, here having a countdown ratio of 51,200 to 1, operating to provide modulator-triggering pulses at a repetition period of substantially 0.661 second, the exact period being dependent of course upon the exact value of frequency $f_c$. These modulator-triggering pulses control modulator circuit 22 to effect pulse modulator of the frequency $f_t$ oscillator and amplifier 23. Electro-acoustic projector 24, preferably mounted on the underside of torpedo 10 as indicated schematically in FIG. 1, is correspondingly energized to transmit ultrasonic pulses at carrier frequency $f_t$ at instants occurring at the 0.661 second intervals. The remaining channel, of the torpedo-borne apparatus 10', in this embodiment transfers its frequency $f_c$ information to the pre-launch synchronization-site apparatus through amplifier 25 and electro-acoustic projector 26 (located at any convenient point, not shown, along the torpedo shell) for purposes which will appear.

Referring next to FIG. 3, the torpedo launching craft or other platform, employed for synchronizing operations and for the latter reason here termed the pre-launch synchronization-site, is provided with auxiliary apparatus 14' which operates in association with the torpedo-borne apparatus 10', prior to torpedo launching, to receive and convert the torpedo's $f_c$ and $f_t$ output signals to other signals, suitable for transmission by radio link, for synchronization of the clock-oscillator and frequency divider units of the shore station apparatus. With the torpedo at the pre-launch synchronization-site, transducers 30 and 31 are to be understood as located in proximity to the torpedo projectors 24 and 26, respectively, or in any event associated in such maner as to pick up the $f_t$ and $f_c$ emanations, here indicated schematically. The repetitive pulses carried by the ultrasonic 250 kc./s. $f_t$ signal are extracted by means of detector 32 and re-utilized by means of pulse-modulator 33 to effect modulation of transmitter 34, the latter operating at any convenient radio communication frequency $f_p$ for transmission to the shore station. The 77.46 kc./s. output $f_c$ signal received by transducer 31 is converted by frequency divider 35, having a countdown ratio of say 20 to 1, to a signal at submultiple-frequency, in this instance 3.873 kc./s., which is then employed by means of modulator 36 to effect tone modulation of transmitter 37, the latter operating at some other convenient radio communication frequency $f_s$ for transmission to the shore-station.

Referring now to the shore station apparatus 12' shown in FIG. 4, the acoustic signal receivers 41, computer 42 and recording apparatus 43, also $f_c'$ clock-oscillator 44 and the frequency divider and pulse generator 45, are employed continually during the torpedo run, the computers 42 requiring and receiving reference pulses, via lead 46, derived from oscillator 44 by means of frequency divider and pulse generator 45.

Prior to torpedo launch, the $f_c'$ clock-oscillator 44 and the frequency divider and pulse generator 45 are set to provide reference pulses in synchronism with the ultrasonic pulses as generated by the torpedo-borne apparatus, by use of the $f_s$ and $f_p$ signal transmissions from the pre-launch synchronization-site, in conjunction with remaining units of the shore station apparatus. The tone modulation carried by the $f_s$ signal, being at a submultiple frequency of the $f_c$ oscillator 20 signal, effectively serves as a reference signal by means of which the clock-oscillator 44 signal frequency $f_c'$ can be precisely matched to that of the $f_c$ signal; the pulsed $f_p$ signal is employed to insure starting of the countdown action of frequency divider and pulse generator 45 at the proper instant to thereafter provide reference pulses at precisely the ultrasonic pulse transmission instants.

In greater detail, during pre-launch synchronization operations the $f_c'$ oscillator 44 is utilized with circular sweep circuit 47 to provide a circular trace upon CRO (cathode ray oscilloscope) tube 48, each complete circular sweep of such trace being produced by one cycle of $f_c'$ oscillator 44 operation. The $f_s$ signal picked up by receiver 49 is demodulated by tone detector 50 to extract the tone modulation signal which is then passed through filter 51 before application to pulse generator 52. Pulse generator 52 operates to generate say 1-microsecond pulses at the zero-axis crossing instants of the 3.873 kc./s. tone modulation signal, which pulses are utilized by means of Z-axis modulator 53 to effect CRO tube beam intensification at the said zero-axis crossing instants; the bright marker spot thus produced upon the CRO tube moves along the circular trace in a direction and at a rate dependent upon and thus indicative of the difference between the $f_c$ and $f_c'$ signal frequencies, and comes to a standstill when the fine adjustment control 55 has been properly set to place the $f_c'$ oscillator 44 signal frequency to precisely the same frequency as that of the 77.46 kc./s. $f_c$ oscillator 20 signal.

Narrow bandpass filter 51 serves to provide a so-called flywheel effect which stabilizes the zero-axis crossing period (of the 3.873 kc./s. tone modulation signal as applied to pulse generator 52) to substantially constant value, and consequently prevents jitter of the bright marker spot formed upon the CRO tube.

As in the elctronic-clock system employed in the torpedo-borne apparatus 10', the frequency divider and pulse generator 45 in shore station apparatus 12' provides a countdown ratio of 51,200 to 1, consequently delivering its reference pulses at exactly the same intervals (after $f_c'$ oscillator 44 frequency synchronization) as in the case of the ultrasonic pulses generated by the torpedo-borne apparatus. As necessary in addition to duplicating the period characteristic, the reference pulses are made to occur in time-coincidence with the ultrasonic pulse transmissions, by means of conventional countdown-starting circuits forming part of frequency divider and pulse generator 45 and controlled by pulses extracted from the pulse-modulated $f_p$ signal picked up by receiver 54; several pulse periods of operation, after $f_c'$ oscillator 44 frequency synchronization, suffice to insure setting of the proper countdown-start instant, frequency divider and pulse generator 45 thereafter continuing to provide reference pulses in time-coincidence with the ultrasonic pulse transmissions to a degree of precision corresponding to the frequency constancy of the $f_p$ and $f_c'$ clock oscillators 20 and 44.

It will be appreciated that a high degree of frequency constancy of the $f_c$ and $f_c'$ clock oscillators 20 and 44, during the ensuing period encompassing preparation, launching and run operations, is of importance to securing and maintaining accuracy of torpedo location throughout the run. If a coordinate error due to timing inaccuracy is not to exceed one foot, for example, the reference and ultrasonic pulses must not drift from time-coincidence by more than about one-fifth millisecond by the end of the run. Oscillators 20 and 44 are therefore to be understood as having a suitably high degree of frequency stability. The $f_c'$ crystal oscillator 44 of the shore station apparatus is of adjustable type as indicated, enabling the signal frequency to be precisely set during synchronizing operations as described; excellent frequency stability is easily provided by use of suitable oscillator apparatus of conventional type, and including a temperature controlled oven. Rather than to employ such oven means for the $f_c$ oscillator 20 in the torpedo, however, which would pose torpedo preparation problems, it has been found entirely satisfactory to encase the crystal unit of this oscillator 20 in a thermal mass, then in thermal insulation (not shown); the $f_c$ oscillator 20 circuit may be of conventional type in which the crystal operates in its pure series resonant mode and without degradation of the quality factor Q, thus providing best stability. By the use of such techniques, the $f_c$ oscillator temperature and characteristics dependent thereon are made to remain substantially fixed, during torpedo launching preparation and run time, at the same values as during the pre-launch synchronization of the shore station apparatus. In order to accommodate longer run times, crystal ovens in the torpedo are needed.

During the torpedo run, therefore, computer 42 is supplied with reference pulses, via lead 46, in time-coincidence with the torpedo's ultrasonic $f_t$ pulse transmission instants. The torpedo's $f_c$ signal and the synchronization-site $f_p$ and $f_s$ transmissions may of course be terminated following synchronizing operations.

As in the earlier system described above, the torpedo's echo-ranging signals, in this instance the ultrasonic $f_t$ pulse signals, as received at the $H_c$, $H_x$, $H_y$ and $H_z$ hydrophones are communicated via cable 12 (FIG. 1) to four separate receiver channels (not shown) in the acoustic signal receivers 41 (FIG. 4), and the resultant detected pulses are applied to X, Y and Z coordinate-derivation channels (not shown) in computer 42 which operate to provide voltages proportional to and thus representative of the torpedo's coordinates. In this instance, however, computer 42 effects derivation of these coordinates from the occurrence periods of the detected pulses relative to the preceding reference pulse (corresponding to the transit times of the ultrasonic pulses), and in accordance with computer solution of expression (2) or of a mathematically equivalent expression, by computer instrumentation which in itself can employ entirely conventional techniques. For example, computer instrumentation may be based upon a mathematically equivalent expression involving an integration operation which is easily instrumented. Specifically, expression (2) is first written in the form $$\frac{(ct_1)^2 - (ct_2)^2}{2d} + \frac{d}{2} \quad (3)$$

wherein constant $c$ is the velocity of sound in water, variable $t_1$ is the ultrasonic pulse transit time to hydrophone $H_c$ and variable $t_2$ is the ultrasonic pulse transit time to the remaining hydrophone pertinent to the particular coordinate of interest; expression (3) in turn can be written in the equivalent form $$\frac{c^2}{2}\int_{t_2}^{t_1} t\,dt + \frac{d}{2} \quad (4)$$

involving integration of transit time designated generally as $t$. The coordinates given by evaluation of expression (4), involving integration limits set by the time intervals measured from reference pulse occurrence (corresponding to an ultrasonic pulse transmission instant) to ensuing receptions of an ultrasonic pulse at each of the hydrophones, are readily provided as proportional voltages by conventional computer techniques.

Recording apparatus 43, to which the computer's output voltages are applied as indicated in FIG. 4, may take any conventional form, such as a strip chart recorder which plots say the Z-coordinate (torpedo depth relative to the reference frame X–Y plane) against a time-base, or a function plotter which provides a record of say the torpedo's course in an azimuthal plane (X versus Y), or digital readout and printing apparatus which records any or all of the coordinates directly in feet together with time-indentifying point number, or of course any combination of such recorders.

Having described an illustrative echo-ranging and target tracking system embodying the present invention, it will now be understood that by providing the body under investigation with electronic-clock-controlled means for transmitting ultrasonic energy pulses, an array of four hydrophones establishing a Cartesian coordinate reference frame, shore station apparatus comprising receivers associated with the hydrophone array and with a computer including electronic-clock-controlled means for generating reference pulses, and means for initially synchronizing the latter pulses into time-coincidence with ultrasonic pulse transmissions from said body, wherein the computer may employ conventional instrumentation techniques but operates to provide solutions of expressions as disclosed, body tracking is accomplished with greater precision and at greater maximum body distances from the reference frame origin than heretofore.

It will now also be apparent that many modifications of the illustrative system may be made without departing from the spirit and scope of the invention. For example, while transfer of the frequency $f_c$ information and $f_t$ pulse period information to the pre-launch synchronization site apparatus 14' has here been shown as effected through the use of projectors and receiving transducers, such transfer can instead be effected directly through connectors and temporary cabling connecting say amplifier 25 to frequency divider 35 (enabling omission of projector 26 and transducer 31) and from frequency divider and pulse generator 21 to pulse modulator 33 (enabling omission of transducer 30 and detector 32). Further, in some applications of the invention, it may be desirable to effect synchronization of torpedo and shore-station pulse-controlling clock apparatus directly rather than by use of synchronization site apparatus and radio link and associated radio receiving apparatus. It will therefore be understood that the foregoing and other modifications and variations of the present invention are possible in the light of the above teachings, and that within the scope of the appended claims the invention may be practiced otherwise than as specifically described.

What is claimed is:

1. A system for determining a positional coordinate of a body in a preselected water region, said system comprising:

(a) means carried by said body for emitting an ultrasonic energy pulse;

(b) a pair of spaced hydrophones fixedly positioned in said water region along a line corresponding to a cordinate axis, one hydrophone at a point corresponding to the coordinate axis origin, the other hydrophone spaced therefrom at a predetermined distance, for reception of said ultrasonic pulse at instants, relative to the pulse emission instant, dependent upon the positional coordinate of said body relative to said coordinate axis and origin;

(c) and remotely-located apparatus for detection of said ultrasonic pulses and for derivation of said positional coordinate therefrom, said apparatus including a receiver and a computer;

(d) said receiver having identical channels connected individually to said hydrophones, each said channel operating to provide an output pulse upon reception of said ultrasonic pulse at the hydrophone of that channel;

(e) said computer including means for generating a reference pulse in time-coincidence with the ultrasonic pulse emission instant, and operating in connection with said reference and output pulses to derive, from the set of time intervals between said reference pulse and the ensuing output pulses, a voltage proportional to and thus representative of the positonal coordinate of the body relative to said coordinate axis and origin.

2. A system for determining a positional coordinate of a body in a preselected water region, said system comprising:

(a) means carried by said body for emitting an ultrasonic enregy pulse;

(b) a pair of spaced hydrophones fixedly positioned in said water region along a line corresponding to a cordinate axis, one hydrophone at a point corresponding to the coordinate axis origin, the other hydrophone spaced therefrom at a base distance $d$, for reception of said ultrasonic pulse at instants, relative to the pulse emission instant, dependent upon the positional coordinate of said body relative to said coordinate axis and origin;

(c) and apparatus located at a distance from said hydrophones and connected thereto for detection of said ultrasonic pulses and for derivation of said positional coordinate therefrom, said apparatus including a receiver and a computer;

(d) said receiver having identical channels connnected individually to said hydrophones, each said channel operating to provide an output pulse upon reception of said ultrasonic pulse at the hydrophone of that channel;

(e) said computer including means for generating a reference pulse in time-coincidence with the ultrasonic pulse emission instant, and operating in connection with said reference and output pulses to derive, from the set of time intervals between said reference pulse and the ensuing output pulses, a voltage proportional to and thus representative of the positional coordinate of the body, relative to said coordinate axis and origin, in accordance with the expression $$\frac{C^2}{2}\int_{t_2}^{t_1} t\, dt + \frac{d}{2}$$

wherein $c$ is the velocity of sound in water, $d$ is the hydrophone base distance, $t$ represents ultrasonic pulse transit time generally, $t_1$ is the ultrasonic pulse transit time to the center hydrophone, and $t_2$ is the ultrasonic pulse transit time to the remaining hydrophone.

3. A system for determining positional coordinates of a torpedo at each of a number of successive points along a course run by said torpedo during operation in a preselected water region, said system comprising:

(a) clock-controlled means carried by said torpedo for emitting an ultrasonic energy pulse at uniformly repetitive instants;

(b) a set of four hydrophones fixedly positioned in said water region and in a configuration establishing a three-dimensional Cartesian coordinate reference frame, said configuration having a center-hydrophone at the coordinate frame origin and three other hydrophones spaced therefrom at predetermined distances along X, Y and Z axes, for reception of an emitted ultrasonic pulse at instants, relative to the pulse emission instant, dependent upon the positional coordinates of the torpedo at the time of ultrasonic pulse emission;

(c) apparatus located at a distance from said hydrophones and connected thereto for detection of ultrasonic pulses received by said hydrophones and for derivation of said positional coordinates therefrom, said apparatus including a receiver and a computer;

(d) said receiver having identical channels connected individually to said hydrophones, each said channel operating to provide an output pulse upon reception of an ultrasonic pulse at the hydrophone of that channel;

(e) said computer including electronic-clock-controlled means for generating reference pulses;

(f) means for effecting synchronization of said reference pulses, prior to torpedo launching, into time-coincidence with said ultrasonic pulse transmission instants;

(g) and said computer operating in connection with said reference and output pulses to derive, from each set of time intervals between a reference pulse and ensuing output pulses, voltages proportional to and thus representative of the positional coordinates.

4. A system for determining positional coordinates of a torpedo at each of a number of successive points along a course run by said torpedo during operation in a preselected water region, said system comprising:

(a) means carried by said torpedo for repetitively emitting an ultrasonic energy pulse;

(b) a set of four hydrophones fixedly positioned in said water region and in a configuration establishing a three-dimensional Cartesian coordinate reference frame, said configuration having a center-hydrophone at the coordinate frame origin and three other hydrophones along X, Y and Z axes, at base distances $d$ from the origin, for reception of an emitted ultrasonic pulse at instants, relative to the pulse emission instant, dependent upon the positional coordinates of the torpedo at the time of ultrasonic pulse emission;

(c) and remotely-located apparatus for detection of said ultrasonic pulses and for derivation of said positional coordinates therefrom, said apparatus including a receiver and a computer;

(d) said receiver having identical channels connected individually to said hydrophones, each said channel operating to provide an output pulse upon reception of an ultrasonic pulse at the hydrophone of that channel;

(e) said computer including means for generating reference pulses in time-coincidence with ultrasonic pulse emissions from said torpedo, and operating in connection with said reference and output pulses to derive, from each set of time intervals between a reference pulse and ensuing output pulses, voltages proportional to and thus representative of the positional coordinates, each in accordance with the expression $$\frac{C^2}{2}\int_{t_2}^{t_1} t\, dt + \frac{d}{2}$$

wherein $c$ is the velocity of sound in water, $d$ is the hydrophone base distance, $t$ represents ultrasonic pulse transit time generally, $t_1$ is the ultrasonic pulse transit time to the center hydrophone, and $t_2$ is the ultrasonic pulse transit time to that remaining hydrophone pertinent to the particular coordinate of interest.

5. A system for determining positional coordinates of a torpedo at each of a number of successive points along a course run by said torpedo during operation in a preselected water region, said system comprising:

(a) clock-controlled means carried by said torpedo for emitting an ultrasonic energy pulse at uniformly repetitive instants;

(b) a set of four hydrophones fixedly positioned in said water region and in a configuration establishing a three-dementional Cartesian coordinate referframe, said configuration having a center-hydrophone at the coordinate frame origin and three other hydrophones along X, Y and Z axes, at base distances $d$ from the origin, for reception of an emitted ultrasonic pulse at instants, relative to the pulse emission instant, dependent upon the positional coordinates of the torpedo at the time of ultrasonic pulse emission;

(c) apparatus located at a distance from said hydrophones and connected thereto for detection of ultrasonic pulses received by said hydrophones and for derivation of said positional coordinates therefrom, said apparatus including a receiver and a computer;

(d) said receiver having identical channels connected individually to said hydrophones, each said channel operating to provide an output pulse upon reception of an ultrasonic pulse at the hydrophone of that channel;

(e) said computer including electronic-clock-controlled means for generating reference pulses;

(f) means for effecting synchronization of said reference pulses, prior to torpedo launching, into time-coincidence with said ultrasonic pulse transmissions instants;

(g) and said computer operating in oonnection with said reference and output pulses to derive, from each set of time intervals between a reference pulse and ensuing output pulses, voltages proportional to and thus representative of the positional coordinates, each in accordance with the expression $$\frac{C^2}{2}\int_{t_2}^{t_1} t\,dt + \frac{d}{2}$$

wherein $c$ is the velocity of sound in water, $d$ is the hydrophone base distance, $t$ represents ultrasonic pulse transit time generally, $t_1$ is the ultrasonic pulse transit time to the center hydrophone, and $t_2$ is the ultrasonic pulse transit time to that remaining hydrophone pertinent to the particular coordinate of interest.

References Cited by the Examiner
UNITED STATES PATENTS
1,785,307  12/30  Hammond _____ 340—6

CHESTER L. JUSTUS, *Primary Examiner.*